United States Patent
Hayashi

(10) Patent No.: US 10,887,377 B2
(45) Date of Patent: Jan. 5, 2021

(54) CONTROL SYSTEM, CONTROL METHOD AND EQUALIZATION APPARATUS

(71) Applicant: Yokogawa Electric Corporation, Tokyo (JP)

(72) Inventor: Shunsuke Hayashi, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 163 days.

(21) Appl. No.: 16/134,979

(22) Filed: Sep. 19, 2018

(65) Prior Publication Data

US 2019/0109890 A1 Apr. 11, 2019

(30) Foreign Application Priority Data

Oct. 6, 2017 (JP) .................................. 2017-195891

(51) Int. Cl.
- *H04L 29/08* (2006.01)
- *G05B 19/418* (2006.01)
- *G06Q 10/06* (2012.01)
- *H04L 12/931* (2013.01)

(52) U.S. Cl.
CPC ............ *H04L 67/10* (2013.01); *G05B 19/418* (2013.01); *G06Q 10/06395* (2013.01); *H04L 49/351* (2013.01); *H04L 67/12* (2013.01)

(58) Field of Classification Search
CPC ....... H04L 67/10; H04L 67/12; H04L 49/351; G05B 19/418
See application file for complete search history.

(56) References Cited

U.S. PATENT DOCUMENTS

| 2016/0065656 A1 | 3/2016 | Patin |
| 2016/0098388 A1* | 4/2016 | Blevins ................. G06F 16/258 707/755 |
| 2016/0146119 A1* | 5/2016 | Furukawa ................. F02C 9/22 701/100 |
| 2017/0277604 A1* | 9/2017 | Wang .................... G06F 11/184 |

FOREIGN PATENT DOCUMENTS

| JP | H0778004 A | 3/1995 |
| JP | H07282020 A | 10/1995 |
| JP | 10011101 A * | 6/1996 |
| JP | 2003140707 A | 5/2003 |
| JP | 2014063414 A | 4/2014 |

OTHER PUBLICATIONS

Office Action issued for counterpart Japanese Application No. 2017-195891, issued by the Japanese Patent Office, dated Mar. 24, 2020.

* cited by examiner

*Primary Examiner* — Mohammad Ali
*Assistant Examiner* — Vincent W Chang

(57) ABSTRACT

A control system, a control method and an equalization apparatus for improving process control reliability are provided. In each equalization apparatus, a received-data outputting unit sends, to a network, input data from a sensor measuring a state of a process; an other-apparatus-data receiving unit acquires the input data from the received-data outputting unit and receives, from the network, input data sent from each of other equalization apparatuses than itself; and a data selecting unit selects, as output data, a representative value of the input data acquired by the other-apparatus-data receiving unit. Each computing apparatus calculates a manipulative variable of an actuator based on the output data from a corresponding equalization apparatus.

7 Claims, 7 Drawing Sheets

CONTROL SYSTEM, CONTROL METHOD AND EQUALIZATION APPARATUS

The contents of the following Japanese patent application(s) are incorporated herein by reference:
NO. 2017-195891 filed on Oct. 6, 2017.

BACKGROUND

1. Technical Field

The present invention relates to a control system, a control method and an equalization apparatus.

2. Related Art

Process control systems and safety instrumented systems (hereinafter collectively referred to as DCSs) may be used for control in production plants of chemical products, petroleum, gases or the like. In case that an abnormality occurs in their operation, a large amount of raw materials may be wasted and sometimes accidents may occur. Thus, very high reliability may be required for the DCSs. On the other hand, DCS users may require open architecture that is not dependent on particular vendors for purposes of future scalability, flexible availability of apparatuses, cost reduction and the like. Scalability refers to the capability to introduce new technologies (see Patent Document 1). The purposes of adopting such a configuration are, for example, to have multi-vendor capability, to cope with dynamic changes in functions and specifications, and the like. Further demands include implementing controllers with general-purpose PCs (Personal Computers) instead of dedicated hardware, independence from particular processors, and on-line functional enhancements without stopping control.

In view of reliability, a manner as shown in FIG. 7 has been proposed, in which a plurality of controllers (computing apparatuses) 40 (40-1, 40-2 and 40-3 in the example shown in FIG. 7) are provided in a DCS 9, and an actuator 60 is driven based on the one of their computation results that is first delivered to a selection apparatus 50 (see Patent Document 2). An advantage of the multiplexed controllers 40 is that, even in case that some of the controllers 40 stop their operation or some network paths are cut off, the computation results from the other, normally operating controllers 40 or network paths can be utilized to continue the control.

However, if a controller 40 outputs an erroneous computation result, this cannot be detected in this configuration. Possible measures include providing the controllers 40 with a self-diagnostic function to prevent the output of erroneous computation results. If the erroneous computation results are not detected in time, control will be performed based on these results.

Thus, a possible measure is that, for example, the selection apparatus 50 outputs, to the actuator 60, a selection result obtained by majority decision or median averaging on the computation results of the controllers 40, so as to ensure the reliability (see Patent Document 3). In this manner, even if some of the multiplexed controllers 40 output erroneous computation results or transmit previous computation results due to the communication condition between the controllers 40 and the selection apparatus 50, the erroneous computation results are excluded.

Patent Document 1: U.S. Patent Application Publication No. 2016-0065656
Patent Document 2: Japanese Patent Application Publication No. 2014-063414
Patent Document 3: Japanese Patent Application Publication No. 2003-140707

SUMMARY

However, if the communication between a distribution apparatus 20 and each controller 40 or the communication between each controller 40 and the selection apparatus 50 is made via a network to which various devices is connected, such communication will be performed via various network paths. Thus, even when the controllers 40 and the network paths operate normally, different values may be input to the controllers 40 due to the occurrence of the following events: loss or change of data through some paths, caused by external noise generated due to a lightening strike or the like; and delay of some data, caused by redelivery or detour in data transmission paths. If different values are input to the controllers 40 due to such an event, parameters (for example, an integral value for PID control) stored in the controllers 40 will also be different between the controllers 40. As a result, the computation results (outputs) from the controllers 40 remain different for a long time, impairing the process control reliability.

The present invention has been made in view of the above-described facts, and provides a control system, a control method and an equalization apparatus that can improve the process control reliability.

(1) The present invention has been made to solve the above-described issues, and an aspect of the present invention provides a control system comprising: a plurality of equalization apparatuses that receive, as input data, data transmitted from a sensor measuring a state of a process; and a plurality of computing apparatuses that are provided in correspondence with the respective equalization apparatuses and calculate a manipulative variable of an actuator for controlling the process by using output data from the corresponding equalization apparatuses, wherein each of the equalization apparatuses comprises: a received-data outputting unit that sends the input data to a network; an other-apparatus-data receiving unit that acquires the input data from the received-data outputting unit and receives, from the network, input data sent from each of other equalization apparatuses; and a data selecting unit that selects, as the output data, a representative value of the input data acquired by the other-apparatus-data receiving unit, and wherein each of the computing apparatuses calculates the manipulative variable of the actuator based on the output data from a corresponding one of the equalization apparatuses.

(2) Another aspect of the present invention provides the above-described control system, wherein each of the equalization apparatuses comprises an input-data receiving unit that, when the input data is not received within a reception period repeated for each control cycle, outputs input data received most recently or predetermined input data to the received-data outputting unit.

(3) Another aspect of the present invention provides the above-described control system, wherein the input-data receiving unit adds, to input data to be output to the received-data outputting unit, additional information indicating that the input data is not a latest one.

(4) Another aspect of the present invention provides the above-described control system, wherein the data selecting unit outputs the representative value to the received-data outputting unit, and the received-data outputting unit sends the representative value to the network as the input data.

(5) Another aspect of the present invention provides the above-described control system, wherein the data selecting unit calculates a coincidence degree that is a degree at which respective pieces of the input data acquired from the plurality of equalization apparatuses coincide with each other, and the data selecting unit does not output the output data to the computing apparatus and repeats an operation of outputting the representative value to the received-data outputting unit until the coincidence degree reaches equal to or greater than a predetermined threshold of coincidence degree.

(6) Another aspect of the present invention provides the above-described control system, wherein each of the equalization apparatuses comprises the other-apparatus-data receiving unit and the data selecting unit for each channel of input data, and each of the computing apparatuses calculates the manipulative variable based on the output data for each channel.

(7) Another aspect of the present invention provides the above-described control system, wherein a plurality of computing apparatuses, each being the computing apparatus, are associated with each of the equalization apparatuses, and each of the plurality of computing apparatuses is associated with some or all elements of the output data and a different actuator, and calculates a manipulative variable of the associated actuator based on the elements.

(8) Another aspect of the present invention provides a control method for a control system comprising: a plurality of equalization apparatuses that receive, as input data, data transmitted from a sensor measuring a state of a process; and a plurality of computing apparatuses that are provided in correspondence with the respective equalization apparatuses and calculate a manipulative variable of an actuator for controlling the process by using output data from the corresponding equalization apparatuses, wherein each of the equalization apparatuses performs: a received-data outputting step of transmitting the input data to a network; an other-apparatus-data receiving step of receiving input data sent from each of other equalization apparatuses; and a data selecting step of selecting, as output data, a representative value of the input data acquired by the equalization apparatus itself and the input data acquired in the other-apparatus-data receiving step, and wherein each of the computing apparatuses performs a manipulative-variable calculating step of calculating the manipulative variable of the actuator based on the output data from a corresponding one of the equalization apparatuses.

(9) Another aspect of the present invention provides an equalization apparatus that receives, as input data, data transmitted from a sensor measuring a state of a process, wherein the equalization apparatus comprises: a received-data outputting unit that sends the input data to a network; an other-apparatus-data receiving unit that acquires the input data from the received-data outputting unit and receives, from the network, input data sent from each of other equalization apparatuses; and a data selecting unit that selects, as output data, a representative value of the input data acquired by the other-apparatus-data receiving unit. The summary clause does not necessarily describe all necessary features of the embodiments of the present invention. The present invention may also be a sub-combination of the features described above.

The present invention can improve the process control reliability.

DESCRIPTION OF EXEMPLARY EMBODIMENTS

The embodiments do not limit the invention according to the claims, and all the combinations of the features described in the embodiments are not necessarily essential to means provided by aspects of the invention. The following describes the embodiments of a control system, a control method, and an equalization apparatus according to the present invention with reference to the drawings.

First Embodiment

Figure 1:
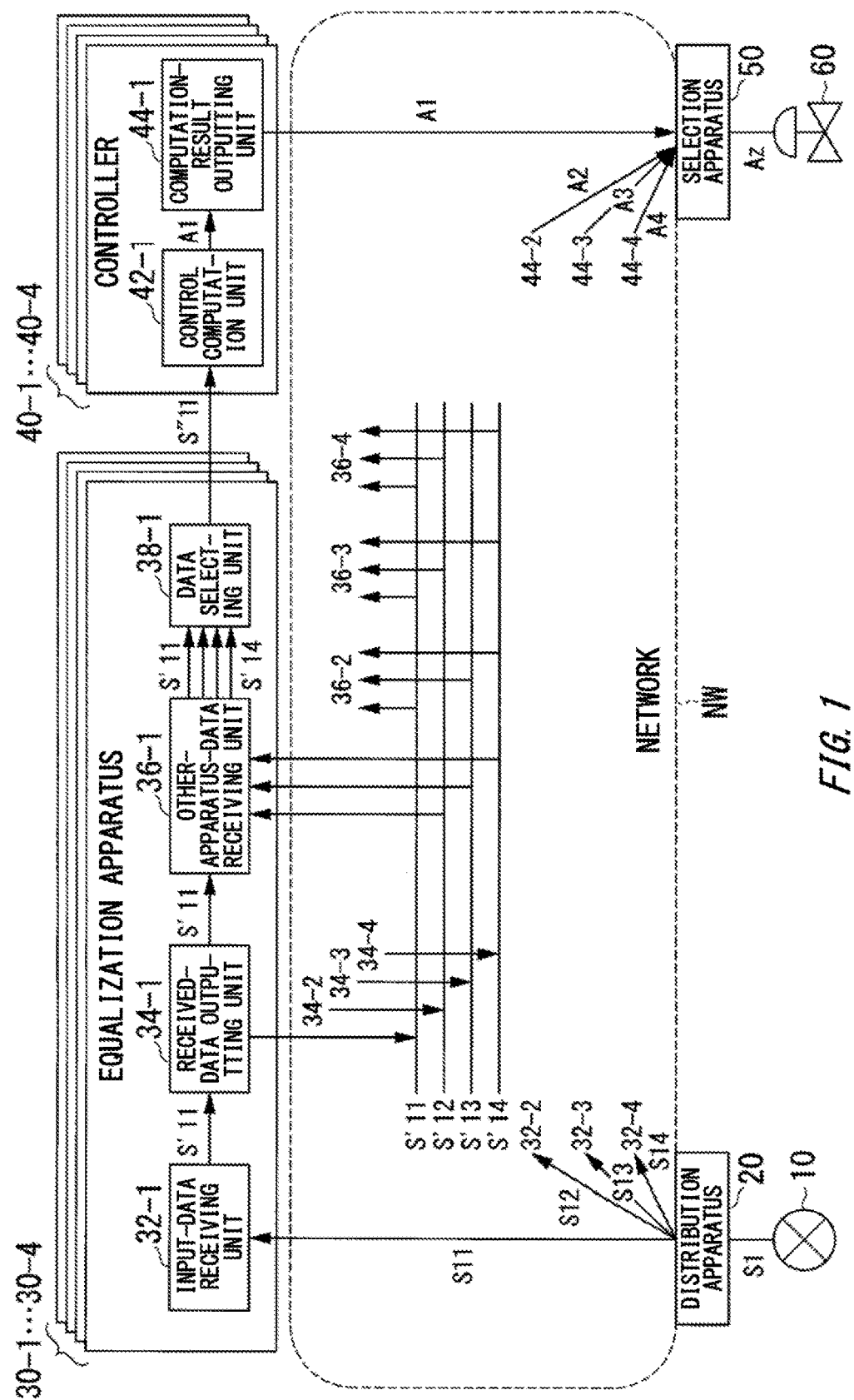
FIG. 1 is a block diagram showing a configuration example of a control system according to a first embodiment.

A configuration example of a control system according to a first embodiment of the present invention is first described. FIG. 1 is a block diagram showing a configuration example of a control system 1 according to the present embodiment. The control system 1 according to the present embodiment includes a distribution apparatus 20, N (N is an integer of 2 or more) equalization apparatuses 30, N controllers 40 and a selection apparatus 50. The following describes an example where N is 4. The equalization apparatuses 30 and controllers 40 and component units thereof (for example, input-data receiving units 32) may be individually given subnumbers such as 1 to 4 for distinction. When a plurality of apparatuses or component units are collectively referred to or do not need to be distinguished, they may be simply referred to without subnumbers, such as equalization apparatuses 30.

Connections via a network NW are made between the distribution apparatus 20 and the four equalization apparatuses 30, between the four equalization apparatuses 30, and between the four controllers 40 and the selection apparatus 50 such that they can communicate with each other. The network NW is a transmission medium which enables wireless or wired transmission of various signals. The network NW may be, for example, a general-purpose LAN (Local Area Network) defined in communications standards such as IEEE 802.3 and IEEE 802.11. The equalization apparatuses 30-1 to 30-4 and the controllers 40-1 to 40-4 are respectively associated, to form four sets of equalization apparatuses 30 and controllers 40. N sets of equalization apparatuses 30 and controllers 40 may be arranged at locations different from each other in a distributed manner.

Although a plurality of sensors 10 and a plurality of actuators 60 may be provided in the plant controlled by the control system 1, FIG. 1 illustrates an example where there are one sensor 10 and one actuator 60. The sensor 10 detects a physical quantity indicating a state of the plant, as a measured value. The sensor is, for example, a temperature sensor for temperature detection, a pressure sensor for pressure detection, a flowmeter for flow rate detection, or the like. The sensor 10 detects a measured value S1, and outputs data of the measured value S1 to the distribution apparatus 20. In the following description, data or a signal indicating the measured value S1 may be simply referred to as the measured value S1. The same applies to other values and quantities. Conversely, a value or quantity indicated by input data S'11 may be referred to as the input data S'11. The same applies to other data. A sampling cycle at which the sensor 10 outputs the measured value S1 may be equal to or shorter than a control cycle. The sampling of the measured value S1 at a cycle shorter than the control cycle is referred to as over-sampling.

The distribution apparatus 20 transmits the measured value S1, input from the sensor 10, to the network NW, to distribute the measured value S1 to the equalization apparatuses 30-1 to 30-4 as measured values S11 to S14, respectively. The distribution apparatus 20 may be configured as a network device such as a network switch, a bridge, or a router, for example. When distributing the measured values S11 to S14, the distribution apparatus 20 may designate the addresses of the individual equalization apparatuses 30-1 to 30-4, or may perform a simultaneous broadcast without designating their addresses.

The equalization apparatuses 30-1 to 30-4 receive the measured values S11 to S14, transmitted from the distribution apparatus 20, as input data S'11 to S'14, respectively. The equalization apparatuses 30-1 to 30-4 output output data S"11 to S"14 to the corresponding controllers 40-1 to 40-4, respectively. The functional configuration of the equalization apparatuses 30-1 to 30-4 will be described later.

The controllers 40-1 to 40-4 calculate, as computation results, manipulative variables A1 to A4 for controlling the state of the plant based on the output data S"11 to S"14, respectively. The controllers 40-1 to 40-4 respectively transmit the generated manipulative variables A1 to A4 to the selection apparatus 50. The functional configuration of the controllers 40-1 to 40-4 will be described later. The selection apparatus 50 receives the manipulative variables A1 to A4 from the controllers 40-1 to 40-4, respectively. The selection apparatus 50 selects a representative value of the manipulative variables A1 to A4 as a manipulative variable Az. The type of the representative value to be selected may be, for example, any of a mode value, a mean value, an earliest value, a median value, a median mean value, and the like. The details of the representative value will be described later in the description of a data selecting unit 38-1. The selection apparatus 50 outputs the selected manipulative variable Az to the actuator 60. The selection apparatus 50 may be configured as a network device such as a network switch, a bridge, or a router, for example.

The actuator 60 adjusts the operation amount (process variable) of the intended operation according to the manipulative variable Az, input from the selection apparatus 50. The actuator 60 is, for example, a valve, a compressor, a pump, a motor, or the like. The operation amount is, for example, the opening degree of the valve, the amount of rotation of the compressor or pump, or the like. In general, the larger the manipulative variable Az is, the larger the process variable of the actuator 60 is. For example, the operation amount of the actuator 60 is proportional to the output value. In the example shown in FIG. 1, the sensor 10, the distribution apparatus 20, the N equalization apparatuses 30, the N controllers 40, the selection apparatus 50 and the actuator 60 form one control loop.

The functional configuration of the equalization apparatus 30-1 will now be described. The equalization apparatuses 30-1 to 30-4 have a functional configuration common to each other, and the following mainly describes the equalization apparatus 30-1. Unless otherwise specified, the description of the equalization apparatus 30-1 applies to the other equalization apparatuses 30-2 to 30-4. The equalization apparatus 30-1 includes an input-data receiving unit 32-1, a received-data outputting unit 34-1, an other-apparatus-data receiving unit 36-1 and a data selecting unit 38-1.

The input-data receiving unit 32-1 receives the measured value S11 from the distribution apparatus 20 via the network NW as input data. The input-data receiving unit 32-1 includes a communication interface, for example. The input-data receiving unit 32-1 outputs the received measured value S11 to the received-data outputting unit 34-1 as input data S'11. The received-data outputting unit 34-1 sends the input data S'11, input from the input-data receiving unit 32-1, to the network NW. Similarly, respective received-data outputting units 34-2 to 34-4 of the other equalization apparatuses 30-2 to 30-4 send input data S'12 to S'14 to the network NW. The received-data outputting unit 34-1 also directly outputs the input data S'11 to the other-apparatus-data receiving unit 36-1, bypassing the network NW.

The other-apparatus-data receiving unit 36-1 receives the input data S'12 to S'14, sent from the other equalization apparatuses 30-2 to 30-4, via the network NW. The input data S'11 is input to the other-apparatus-data receiving unit 36-1 from the received-data outputting unit 34-1. Note that the received-data outputting unit 34-1 may not necessarily directly output the input data S'11 to the other-apparatus-data receiving unit 36-1. In that case, the other-apparatus-data receiving unit 36-1 receives the input data S'11, sent from the received-data outputting unit 34-1 of its own apparatus, via the network NW. The other-apparatus-data receiving unit 36-1 outputs the acquired input data S'11 to S'14 to the data selecting unit 38-1.

The data selecting unit 38-1 selects a representative value of the input data S'11 to S'14, input from the other-apparatus-data receiving unit 36-1, as output data S"11 to be output to the controller 40-1. The data selecting unit 38-1 outputs the selected output data S"11 to the controller 40-1. When selecting the output data S"11, the data selecting unit 38-1 may select a representative value of any of the following types: a mode value (majority decision); a mean value; an earliest value; a median value; a median mean value; and the like. To select the mode value or median value, N needs to be 3 or more. The earliest value refers to a value acquired earliest in a predetermined period T2 (described later) provided in each control cycle. The median mean value is equivalent to the mean value of a median portion of the acquired input values defined by excluding predetermined n top and m bottom input values. Therefore, to select the median mean value, the N needs to be 4 or more. Note that it is needed for the equalization apparatuses 30-1 to 30-4 to select the same type of representative values. This is because the equalization apparatuses 30-1 to 30-4 are intended to make the output data S"11 to S"14 equal to each other (equalize them). Note that the input-data receiving unit 32-1, the received-data outputting unit 34-1 and the other-apparatus-data receiving unit 36-1 include communication interfaces, for example.

The functional configuration of the controllers 40-1 to 40-4 will now be described. The controllers 40-1 to 40-4 have a functional configuration common to each other, and the following mainly describes the controller 40-1. Unless otherwise specified, the description of the controller 40-1 applies to the other controllers 40-2 to 40-4. The controller 40-1 includes a control computation unit 42-1 and a computation-result outputting unit 44-1.

The control computation unit 42-1 calculates, as a manipulative variable A1, a computed value obtained by performing control computation on the output data S"11, input from the equalization apparatus 30-1, in a predetermined manner such that the deviation from a set variable for the measured quantity indicated by the output data S"11 is smaller. The output data S"11 is a value corresponding to the measured value S1 detected by the sensor 10. The manner of the control computation is, for example, PI control, PID control, or the like. PI control is a manner of calculating, as a computed value, the sum of a proportional term, obtained by multiplying a measured value by a predetermined proportional gain, and an integral term, obtained by multiplying the time integral of the measured value by a predetermined integral gain. The PID control is a manner of calculating, as a computed value, the sum of a proportional term, an integral term and a derivative term. The derivative term is a value obtained by multiplying the time derivative of the measured value by a predetermined derivative gain. The control computation unit 42-1 outputs the calculated manipulative variable A1 to the computation-result outputting unit 44-1. For example, the control computation unit 42-1 may include a computational processing circuit such as a CPU (Central Processing Unit), and the computational processing circuit may implement its function by performing an operation indicated by an instruction written in a predetermined control program.

The computation-result outputting unit 44-1 transmits the manipulative variable A1, input from the control computation unit 42-1, to the selection apparatus 50 via the network NW. The computation-result outputting unit 44-1 includes a communication interface, for example.

Note that, in the present embodiment, the input of the measured value from the sensor 10 (sensor input), the equalization, the control computation (output) and the operation of the actuator 60 are preferably synchronized. In particular, it is required that the control computation and the output of the manipulative variables A1 to A4 are performed in synchronization with the control cycle. It is also required that the control computations on the output data S"11 to S"14 from the plurality of equalization apparatuses 30-1 to 30-4 are performed simultaneously.

Thus, the control system 1 may adopt any of the following synchronization manners for synchronization between nodes. (1) An external standard time is used as a timing master, with which all nodes are synchronized. More specifically, each unit of the equalization apparatuses 30-1 to 30-4 and each unit of the controllers 40-1 to 40-4 receive, via the network NW, a synchronization signal broadcasted from a predetermined timer device (not shown) and indicating the standard time. Each unit of the equalization apparatuses 30-1 to 30-4 and each unit of the controllers 40-1 to 40-4 operate by using the standard time indicated by the received synchronization signal as a timing reference. The control system 1 may include a timer device for measuring the standard time, and transmit a synchronization signal indicating the measured standard time to the equalization apparatuses 30-1 to 30-4. (2) Any of the controllers 40-1 to 40-4 generates, as a timing master, a synchronization signal indicating a reference time, and transmits the generated synchronization signal to each unit of the equalization apparatuses 30-1 to 30-4 and each unit of the controllers 40-1 to 40-4 via the network NW. Each unit of the equalization apparatuses 30-1 to 30-4 and each unit of the controllers 40-1 to 40-4 operate by using the reference time indicated by the received synchronization signal as a timing reference.

A predetermined network protocol (for example, NTP (Network Time Protocol)) may be used in either of manners (1) and (2). The above-described timer device is, for example, an NTP server device. The synchronization signal may be a signal having a waveform with a predetermined (for example, pulsed) pattern for each control cycle, or may at least be data indicating the time during each control cycle. Each unit of the equalization apparatuses 30-1 to 30-4 and controllers 40-1 to 40-4 can detect a reference time (for example, the starting point) of each control cycle based on the waveform or time of the synchronization signal. While manners (1) and (2) both use time synchronization via the network NW, an application may require an absolute time. In that case, a convenient manner is synchronization with a standard time as in (1).

[Operation Flow]

Figure 2:
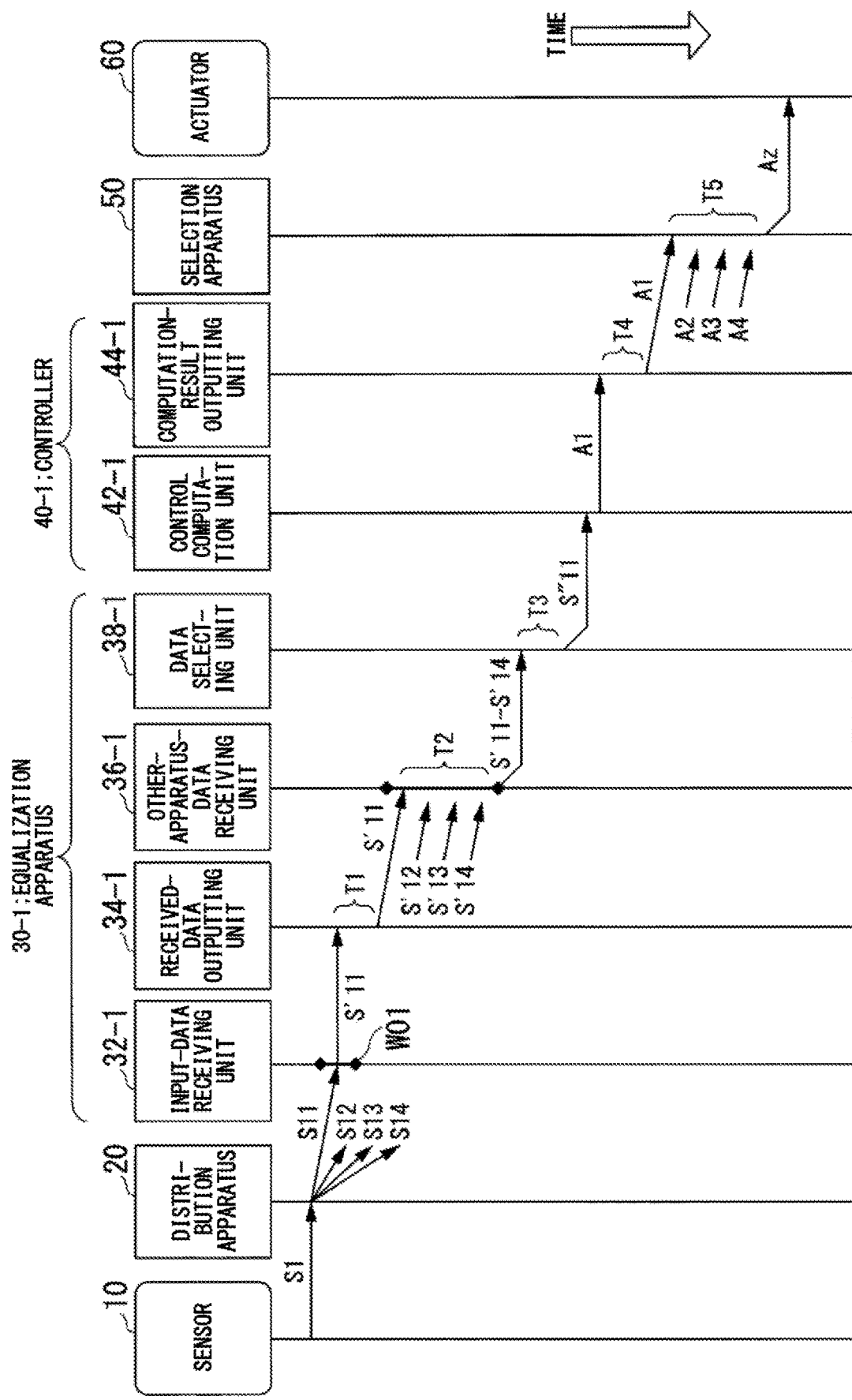
FIG. 2 is an operation time chart showing the operations of the control system according to the first embodiment in each control cycle.

An operation flow of the control system 1 according to the present embodiment will now be described. FIG. 2 is an operation time chart showing the operations of the control system 1 according to the present embodiment in each control cycle. In the following, the description of the equalization apparatus 30-1 applies to the equalization apparatuses 30-2 to 30-4, which are not shown in FIG. 2. Similarly, the description of the controller 40-1 applies to the controllers 40-2 to 40-4, which are not shown.

The sensor 10 outputs a measured value S1 indicating a state of the plant to the distribution apparatus 20. The distribution apparatus 20 distributes the measured value S1, input from the sensor 10, to the equalization apparatuses 30-1 to 30-4 via the network NW as measured values S11 to S14.

The input-data receiving unit 32-1 of the equalization apparatus 30-1 receives the measured value S11 from the distribution apparatus 20, and outputs the received measured value S11 to the received-data outputting unit 34-1 as input data S'11. A reception period W01 is set for the input-data receiving unit 32-1 to receive the measured value S11 in each control cycle. The reception period W01 may be any period of time that is shorter than the control cycle. Depending on the traffic state in the network NW, the input-data receiving unit 32-1 may not be able to receive the measured value S11 within the reception period W01, that is, the measured value S11 may not be updated. In that case, the input-data receiving unit 32-1 may output alternative data to the received-data outputting unit 34-1 as the input data S'11. The input-data receiving unit 32-1 may adopt, as the alternative data, the latest input data S'11 that has been received so far (for example, the measured value S11 received in the reception period W01 of the next previous control cycle) or a predetermined measured value. The input-data receiving unit 32-1 may add, to the alternative data to be output to the received-data outputting unit 34-1, an alternative flag as additional information indicating that the alternative data is not the latest measured value.

Note that, if the sensor 10 performs over-sampling, the input-data receiving units 32-1 to 32-4 may not measure (detect) the measured value S11, with which the input data S'11 to S'14 are associated, from the sensor 10 at strictly the same time. The input-data receiving unit 32-1 may also receive a plurality of measured values S11 in the reception period W01. In that case, the input-data receiving unit 32-1 may output the latest one of the plurality of measured values S11 to the received-data outputting unit 34-1 as the input data S'11.

The received-data outputting unit 34-1 sends the input data S'11, input from the input-data receiving unit 32-1, to the network NW. In FIG. 2, a period T1 indicates the processing time from the input of the input data until the sending thereof. Note that, although FIG. 1 shows an example where the received-data outputting unit 34-1 directly outputs the input data S'11 to the other-apparatus-data receiving unit 36-1, the received-data outputting unit 34-1 may not necessarily directly output the input data S'11 to the other-apparatus-data receiving unit 36-1.

The other-apparatus-data receiving unit 36-1 receives input data S'12 to S'14 from the received-data outputting units 34-2 to 34-4 via the network NW. The input data S'11 is input to the other-apparatus-data receiving unit 36-1 from the received-data outputting unit 34-1 of its own apparatus. If the received-data outputting unit 34-1 does not directly output the input data S'11 to the other-apparatus-data receiving unit 36-1, the other-apparatus-data receiving unit 36-1 receives the input data S'11 via the network.

A reception period T2 is set for the other-apparatus-data receiving unit 36-1 to receive the input data S'11 to S'14 in each control cycle. The reception period T2 may be any period of time that is shorter than the control cycle and whose starting point is a time after the processing time T1 elapses from the end of the reception period W01. The other-apparatus-data receiving unit 36-1 outputs the input data S'11 to S'14, acquired in the reception period T2, to the data selecting unit 38-1. Depending on the traffic state in the network NW and the operating state of the individual equalization apparatuses 30-1 to 30-4, the other-apparatus-data receiving unit 36-1 may not be able to acquire some of the input data S'11 to S'14 within the reception period T2. In that case, the other-apparatus-data receiving unit 36-1 outputs only the input data that is successfully acquired to the data selecting unit 38-1, for example. As will be described for a second embodiment, if the data selecting unit 38-1 outputs (feeds back), to the received-data outputting unit 34-1, a representative value Spd selected from the input data input from the other-apparatus-data receiving unit 36-1, such feedback may be repeated until the other-apparatus-data receiving unit 36-1 receives all of the input data S'11 to S'14. In the case of feeding back the representative value Spd as well, the data selecting unit 38-1 handles the input data input from the other-apparatus-data receiving unit 36-1 as input data acquired by the other-apparatus-data receiving unit 36-1.

The data selecting unit 38-1 selects a representative value of the input data S'11 to S'14, input from the other-apparatus-data receiving unit 36-1, as output data S"11 to be output to the controller 40-1 in the above-described manner. The data selecting unit 38-1 outputs the selected output data S"11 to the controller 40-1. In FIG. 2, a period T3 indicates the processing time from the input of the input data S'11 to S'14 until the output of the output data S"11. Note that, if an alternative flag is added to any of the input data S'11 to S'14, the data selecting unit 38-1 may discard the input data to which the alternative flag is added, so as to exclude it from candidates for the output data S"11, for example. The data selecting unit 38-1 may also select input data to which no alternative flag is added in preference to input data to which an alternative flag is added. In an example, if the data selecting unit 38-1 selects a weighted mean value of the input data, the data selecting unit 38-1 uses a larger weight coefficient for multiplying input data to which no alternative flag is added than a weight coefficient for multiplying input data to which an alternative flag is added.

The control computation unit 42-1 performs control computation in a predetermined control manner on the output data S"11, input from the equalization apparatus 30-1, to calculate a manipulative variable A1 as a computation result. The control computation unit 42-1 outputs the calculated manipulative variable A1 to the computation-result outputting unit 44-1. The computation-result outputting unit 44-1 transmits the manipulative variable A1, input from the control computation unit 42-1, to the selection apparatus 50 via the network NW. In FIG. 2, a period T4 indicates the processing time from the input of the manipulative variable A1 from the control computation unit 42-1 until the transmission thereof to the selection apparatus 50. The starting point of the period T4 is after the processing time for the control computation unit 42-1 elapses from the end of the period T3.

The selection apparatus 50 selects a representative value of the manipulative variables A1 to A4, respectively received from the controllers 40-1 to 40-4, as a manipulative variable Az. The manner of selecting the representative value may be any of the above-described manners. A reception period T5 is set for the selection apparatus 50 to receive the manipulative variables A1 to A4 in each control cycle. The reception period T5 may be any period of time that is shorter than the control cycle and whose starting point is after the end of the period T4. The selection apparatus 50 outputs manipulative data indicating the selected manipulative variable Az to the actuator 60. The actuator 60 adjusts the operation amount of the intended operation according to the manipulative variable Az.

As described above, the control system 1 according to the present embodiment has an open architecture configuration and has the multiplexed controllers 40-1 to 40-4 as shown in FIG. 1. Even in such a configuration, the input values for the controllers 40-1 to 40-4 and the output data S"11 to S"14 can both be made as equal as possible. This can reduce the risk of causing difference between the manipulative variables A1 to A4 as the computation results from the controllers 40-1 to 40-4. Thus, high reliability can be ensured for the control system 1, as well as enjoying the following advantages.

Achieving high reliability with a general-purpose device: Even when a general-purpose device is used as a component of the control system 1, a certain level of reliability can be ensured without special consideration for the operation principle or inner configuration of the device. For example, even when general-purpose PCs are adopted as the controllers 40-1 to 40-4, a general-purpose network device can be adopted as the distribution apparatus 20 or the selection apparatus 50. This is because the integrity of the system for transmission of control computations and input values and computation results thereof and the like can be ensured by virtue of the data selecting units 38-1 to 38-4 and the selection apparatus 50 even in such a case. By providing the controllers 40 using a plurality of general-purpose PCs with relatively high computation performance and low cost, the reliability of the control system 1 as a whole is improved even if the individual PCs have a relatively poor self-diagnostic function.

Facilitation of system maintenance: The determinations for selecting the input data S'11 to S'14 and the manipulative variables A1 to A4 are made by the data selecting units 38-1 to 38-4 and the selection apparatus 50, which receive such information. For example, it is sufficient for the selection apparatus 50 and an output I/O (Input/Output module) for outputting the manipulative variable Az to the actuator 60 to determine whether indication values are received or not and determine the received indication values, without the need for identifying their transmission source. Thus, some of the multiplexed controllers 40-1 to 40-4 can be changed easily. For example, some practically-operating (active) ones of the controllers 40-1 to 40-4 can be changed online using other devices connected to the network NW, and thereby the work involved in such change is significantly reduced compared to before. For example, to upgrade the OSs (Operating Systems) of the controllers 40-1 to 40-4, it is sufficient to stop one by one the control programs of the PCs functioning as the controllers 40, update their OSs, and then restart the control programs. This does not involve change of the operation mode of the equalization apparatus 30 and controllers 40, change of the configuration of connected devices, and the like. Those works can be performed while controlling the plant and without stopping the control, and therefore the effect on operation can be reduced or eliminated.

Second Embodiment

Figure 3:
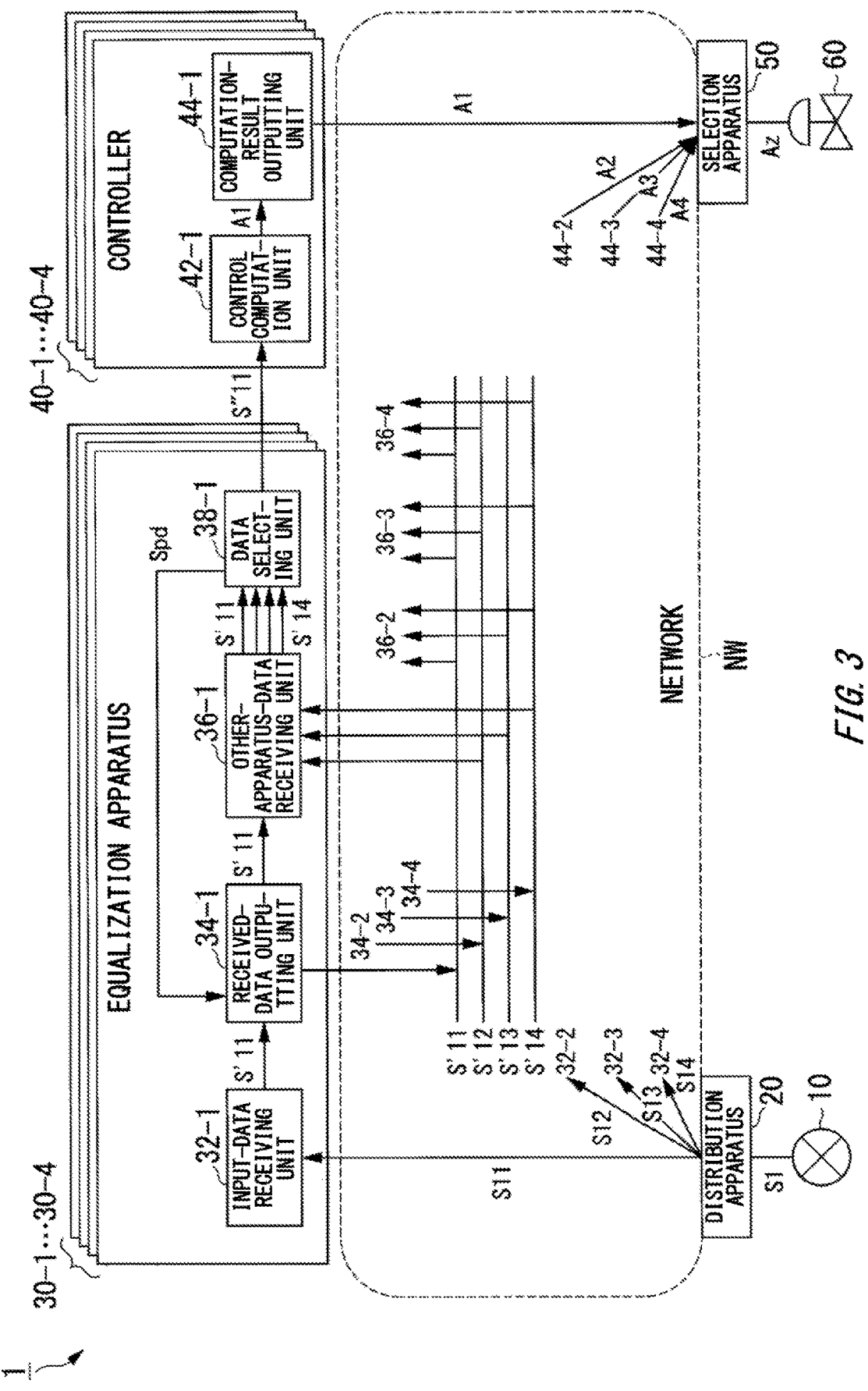
FIG. 3 is a block diagram showing a configuration example of a control system according to a second embodiment.

A second embodiment of the present invention will now be described. The following mainly describes the differences from the first embodiment. The same elements as those in the first embodiment are given the same references, and the same description applies thereto. FIG. 3 is a block diagram showing a configuration example of a control system 1 according to the present embodiment. The control system 1 according to the present embodiment includes a feedback loop from each of the data selecting units 38-1 to 38-4 to its corresponding one of the received-data outputting units 34-1 to 34-4. That is, the data selecting units 38-1 to 38-4 each output a representative value Spd selected from the input data S'11 to S'14 to the received-data outputting units 34-1 to 34-4, respectively. Then, the received-data outputting units 34-1 to 34-4 each send the representative value Spd, input from the data selecting units 38-1 to 38-4, to the network NW as the input data S'11 to S'14. The received-data outputting units 34-1 to 34-4 may each output the representative value Spd to the other-apparatus-data receiving units 36-1 to 36-4 as the input data S'11 to S'14, respectively. Therefore, a series of operations of sending the input data S'11 to S'14 from the received-data outputting units 34-1 to 34-4 and selecting the representative value Spd from the input data S'11 to S'14 in the data selecting units 38-1 to 38-4 is repeated.

Figure 4:
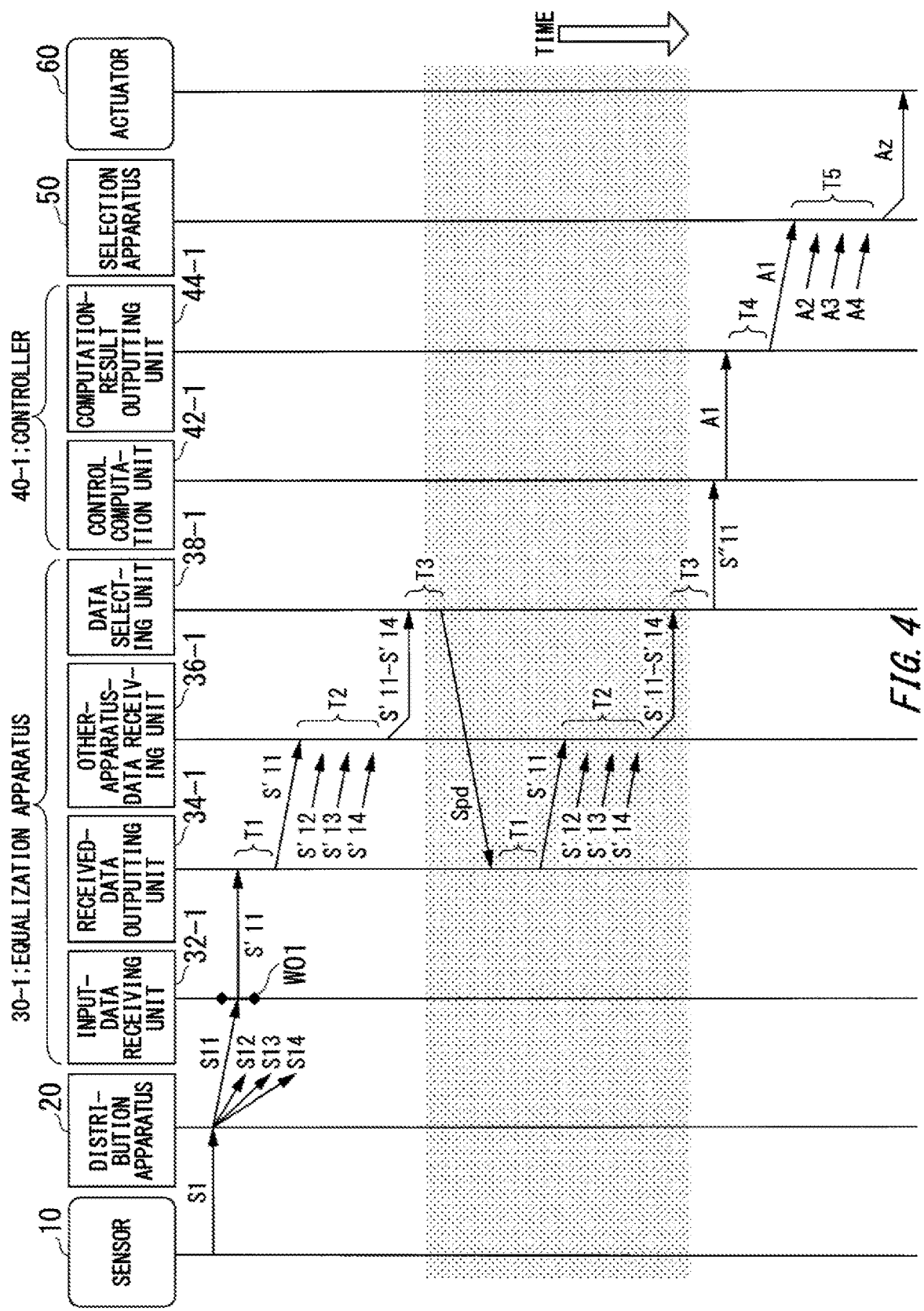
FIG. 4 is an operation time chart showing the operations of the control system according to the second embodiment in each control cycle.

The series of operations is represented by the hatched portion in FIG. 4. The data selecting unit 38-1 counts the number of repetitions of the series of operations, and when the counted number of repetitions reaches equal to or greater than a predetermined number of repetitions, stops repetition and outputs the representative value Spd to the controller 40-1 as output data S"11. Therefore, compared to the case that the series of operations is not repeated, the degree of coincidence (coincidence degree) of the representative values selected from the input data S'11 to S'14, received by the data selecting unit 38-1, is improved. Therefore, the output data S"11 to S"14, input to the controllers 40-1 to 40-4, are more likely to converge in a predetermined permissible range or be the same value as each other.

Note that, instead of presetting the number of repetitions of the series of operations, the data selecting unit 38-1 may calculate the coincidence degree of the input data S'11 to S'14 in the process of selecting the representative value Spd from the input data S'11 to S'14. The coincidence degree is an indication of the degree at which the input data S'11 to S'14 coincide with each other. The coincidence degree is, for example, the proportion of the number of pieces of input data that give the mode value of the input data S'11 to S'14 to the total number of pieces of input data. More specifically, the input data S'11, S'12, S'13 and S'14 are 2, 2, 2 and 3, respectively, the mode value is 2. Thus, the number of pieces of input data that give 2 and the total number of pieces of input data are 3 and 4, respectively, and therefore the coincidence degree is 0.75. The input data to be counted in the total number may include input data that is not received within the reception period T2 by the other-apparatus-data receiving unit 36-1. In this case, the larger the calculated value is, the higher the coincidence degree is. The coincidence degree may also be the difference between the maximum value and minimum value of the input data S'11 to S'14. In this case, the smaller the calculated value is, the higher the coincidence degree is.

When the calculated coincidence degrees are equal to or greater than a predetermined threshold of coincidence degree, the data selecting units 38-1 to 38-4 determine the provisional representative values Spd as the output data S"11 to S"14, respectively, and output the determined output data S"11 to S"14 to the controllers 40-1 to 40-4, respectively. On the other hand, when the calculated coincidence degrees are less than a predetermined threshold of coincidence degree, the data selecting units 38-1 to 38-4 output the representative values Spd to the received-data outputting units 34-1 to 34-4.

Therefore, a series of operations of sending the input data S'11 from the received-data outputting unit 34-1 and selecting the representative value Spd from the input data S'11 to S'14 in the data selecting unit 38-1 is repeated until the coincidence degree reaches equal to or greater than a predetermined coincidence degree. Therefore, the coincidence degree between the output data S"11 to S"14, input to the controllers 40-1 to 40-4, can at least be equal to or greater than a predetermined threshold of coincidence degree. When the coincidence degree reaches equal to or greater than the predetermined threshold of coincidence degree by a single computation, the series of operations is not repeated.

Third Embodiment

Figure 5:
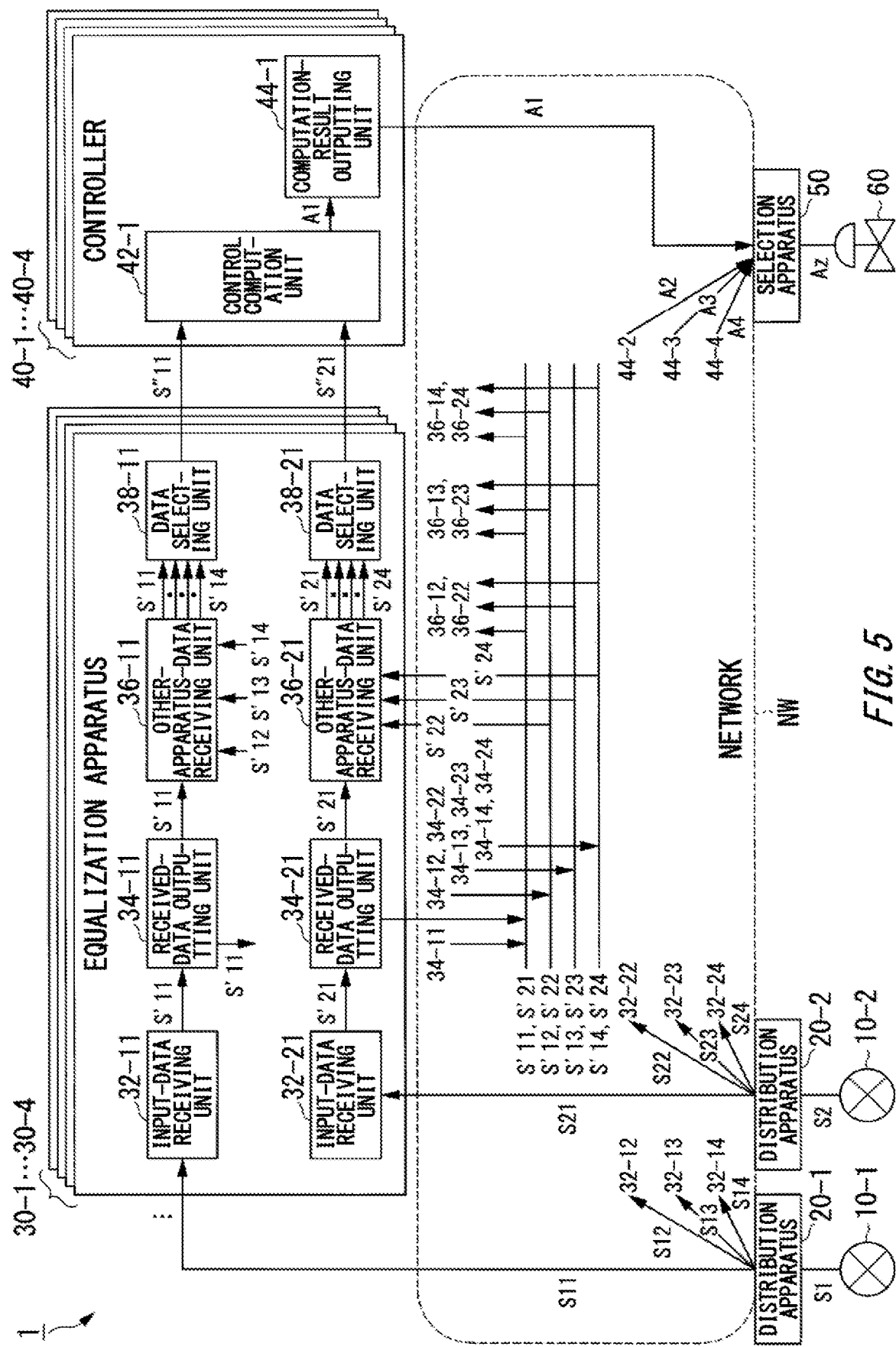
FIG. 5 is a block diagram showing a configuration example of a control system according to a third embodiment.

A third embodiment of the present invention will now be described. The following mainly describes the differences from the first embodiment. The same elements as those in the first embodiment are given the same references, and the same description applies thereto. FIG. 5 is a block diagram showing a configuration example of a control system 1 according to the present embodiment. The control system 1 according to the present embodiment includes two distribution apparatuses 20-1 and 20-2. Measured values S1 and S2 for respective channels are input to the distribution apparatuses 20-1 and 20-2 from sensors 10-1 and 10-2, provided in the plant, respectively. The distribution apparatuses 20-1 and 20-2 distribute the input measured values S1 and S2 to the equalization apparatuses 30-1 to 30-4 via the network NW as measured values S11 to S14 and S21-24.

The equalization apparatuses 30-1 to 30-4 include, for the respective channels of the input data S'11 to S'14 and S'21 to S'24, input-data receiving units 32-11 to 32-14 and 32-21 to 32-24, received-data outputting units 34-11 to 34-14 and 34-21 to 34-24, other-apparatus-data receiving units 36-11 to 36-14 and 36-21 to 36-24, and data selecting units 38-11 to 38-14 and 38-21 to 38-24, respectively. The input-data receiving units 32-11 to 32-14 and 32-21 to 32-24 each have a functional configuration similar to that of the input-data receiving unit 32-1. The received-data outputting units 34-11 to 34-14 and 34-21 to 34-24 each have a functional configuration similar to that of the received-data outputting units 34-1 to 34-4. The other-apparatus-data receiving units 36-11 to 36-14 and 36-21 to 36-24 each have a functional configuration similar to that of the other-apparatus-data receiving units 36-1 to 36-4. The data selecting units 38-11 to 38-14 and 38-21 to 38-24 each have a functional configuration similar to the functional configuration of the data selecting units 38-1 to 38-4.

That is, the input-data receiving units 32-21 to 32-24 output the received measured values S21 to S24 to the received-data outputting units 34-21 to 34-24 as input data S'21 to S'24, respectively. The received-data outputting units 34-21 to 34-24 send the input data S'21 to S'24, respectively input from the input-data receiving units 32-21 to 32-24, to the network NW. The received-data outputting units 34-21 to 34-24 directly output the input data S'21 to S'24 to the other-apparatus-data receiving units 36-21 to 36-24, respectively.

The other-apparatus-data receiving units 36-21 to 36-24 acquire the input data S'21 to S'24, sent from the received-data outputting units 34-21 to 34-24, via the network NW. In the example shown in FIG. 5, the input data S'21 to S'24 are not received via the network NW but are directly input to the other-apparatus-data receiving units 36-21 to 36-24 from the received-data outputting units 34-21 to 34-24, respectively. Note that the received-data outputting units 34-21 to 34-24 may not directly output the input data S'21 to S'24 to the other-apparatus-data receiving units 36-21 to 36-24, respectively. In that case, the other-apparatus-data receiving units 36-21 to 36-24 respectively receive the input data S'21 to S'24 via the network NW. The other-apparatus-data receiving units 36-21 to 36-24 output the acquired input data S'21 to S'24 to the data selecting units 38-21 to 38-24.

The data selecting units 38-21 to 38-24 select representative values of the input data S'21 to S'24, input from the other-apparatus-data receiving units 36-21 to 36-24, as output data S"21 to S"24 to be output to the controllers 40-1 to 40-4, respectively, in the above-described manner. The data selecting units 38-21 to 38-24 select the representative values in the same manner as each other. The data selecting units 38-21 to 38-24 output the selected output data S"21 to S"24 to the controllers 40-1 to 40-4, respectively. Therefore, the output data S"11 to S"14 and S"21 to S"24 for the two respective channels are equalized for each channel before being input to the controllers 40-1 to 40-4.

The controllers 40-1 to 40-4 include control computation units 42-1 to 42-4 to calculate manipulative variables A1 to A4 for one channel from the output data (S"11, S"21) to (S"14, S"24) for the two respective channels. That is, the control computation units 42-1 to 42-4 each perform two-input/one-output control computation. The control computation units 42-1 to 42-4 transmit the calculated manipulative variables A1 to A4 to the selection apparatus 50 via the computation-result outputting unit 44-1 to 44-4, respectively. The selection apparatus 50 selects a representative value Az from the manipulative variables A1 to A4, respectively received from the controllers 40-1 to 40-4, in the above-described manner. The selection apparatus 50 outputs selected data indicating the selected representative value Az to the actuator 60.

Although the embodiment shown in FIG. 5 is applied to two-input/one-output control computation as an example, the number of input channels is not limited to two, and the embodiment may be applied to a multi-input system with three or more channels. In that case, the number of sensors 10 and the number of distribution apparatuses 20 can each be three or more. Also, the equalization apparatuses 30-1 to 30-4 should respectively include input-data receiving units 32-1 to 32-4, received-data outputting units 34-1 to 34-4, other-apparatus-data receiving units 36-1 to 36-4 and data selecting units 38-1 to 38-4 as a set for each channel, and their operations should be performed independently. Note that, in the example shown in FIG. 5, a feedback loop may be provided from each of the data selecting units 38-11 to 38-14 and 38-21 to 38-24 to its corresponding one of the received-data outputting units 34-11 to 34-14 and 34-21 to 34-24 in a manner similar to the example shown in FIG. 3.

While the embodiments shown in FIGS. 1, 3 and 5 are examples where the measured values S11 to S14, respectively input to the equalization apparatuses 30-1 to 30-4 from the sensor 10 via the distribution apparatus 20, are mainly scalar values, these values are not so limited. The input measured values S11 to S14 may each be a vector value. One vector value includes a plurality of element values.

An example will now be described where measured values S11 to S14 that are vector values are respectively input to the input-data receiving units 32-1 to 32-4 shown in FIG. 1. In this example, when selecting a representative value of the input data S'11 to S'14 that are vector values from the other-apparatus-data receiving units 36-1 to 36-4, the data selecting units 38-1 to 38-4 may perform the selecting process based on the original vector values. When calculating the coincidence degree for selecting the representative value, the data selecting units 38-1 to 38-4 may calculate the coincidence degree based on the original vectors. The data selecting units 38-1 to 38-4 each transmit the selected representative value to the corresponding one of the controllers 40-1 to 40-4. Such vector-based processing may also be applied to the feedback loop shown in FIG. 3. More specifically, when the coincidence degree of the vectors reaches equal to or greater than a predetermined coincidence degree, the data selecting units 38-1 to 38-4 no longer feed back the selected representative values. That is, the data selecting units 38-1 to 38-4 transmit the selected representative values to the controllers 40-1 to 40-4. When the coincidence degree of the vectors is less than a predetermined coincidence degree, the data selecting units 38-1 to 38-4 feed back the selected representative values. That is, the data selecting units 38-1 to 38-4 does not transmit the selected representative values to the controllers 40-1 to 40-4 but outputs them to the received-data outputting units 34-1 to 34-4. As the variation of a vector, the meanings of the element values constituting the vector may be utilized. For example, if a vector is constituted by its acquisition time and one or more variables at that time as its element values or the like, the data selecting units 38-1 to 38-4 may perform selection based on the acquisition time or its period of time included in the element values constituting the vector. Time information used is not limited to the acquisition time included in the vector, and the time at which the input-data receiving units 32-1 to 32-4 or the other-apparatus-data receiving units 36-1 to 36-4 acquire the data may be used as a clue for the selection. Therefore, feedback is repeated until a vector value consisting of element values that are components of the input data is acquired. Thus, the reliability of the input data as a vector value is further improved. The control computation units 42-1 to 42-4 of the controllers 40-1 to 40-4 perform predetermined control computations on the representative values (output data S"11 to S"14), input from the data selecting units 38-1 to 38-4, to calculate the manipulative variables A1 to A4, respectively. In this example, the subsequent data flow is similar to that in the example shown in FIG. 5.

Figure 6:
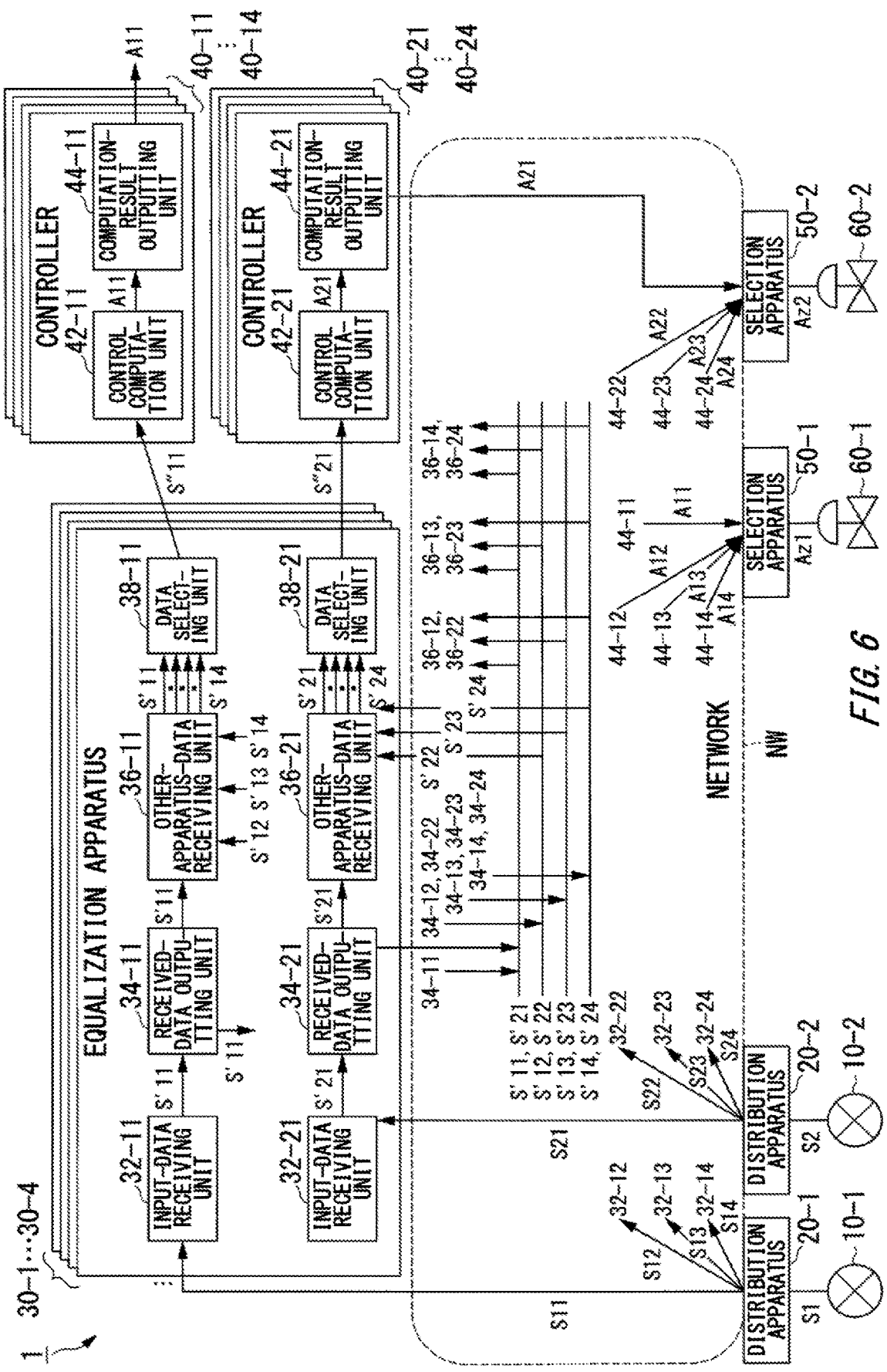
FIG. 6 is a block diagram showing another configuration example of the control system according to the third embodiment.
Figure 7:
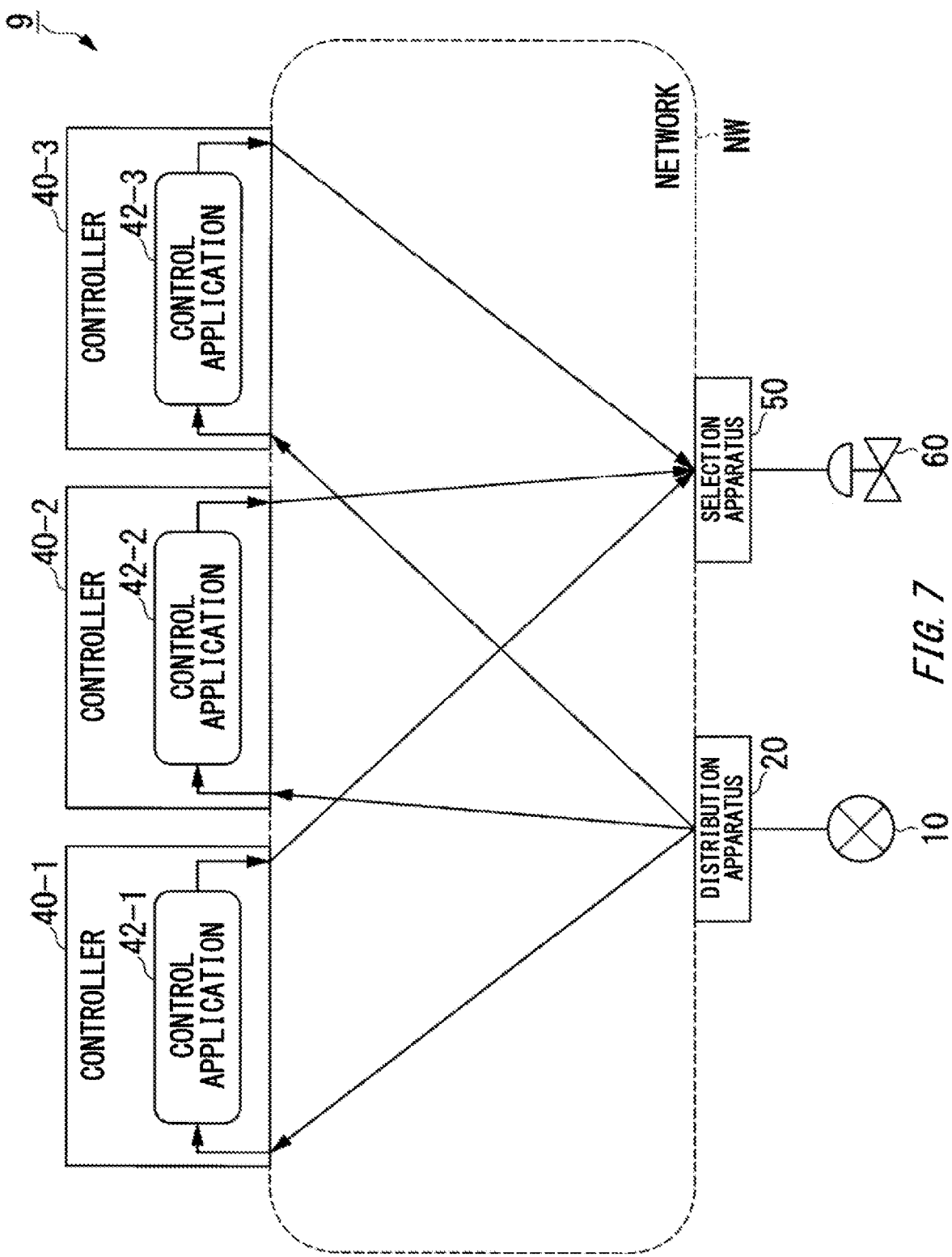
FIG. 7 is a block diagram showing a configuration example of a conventional control system.

As shown in FIG. 6, if each equalization apparatus 30 includes a plurality of data selecting units 38, the control system 1 may include the same number of controllers 40 as the number of data selecting units 38. More specifically, the data selecting units 38-11 to 38-14 and 38-21 to 38-24 are respectively associated with controllers 40-11 to 40-14 and 40-21 to 40-24. The equalization apparatuses 30-1 to 30-4 in the example shown in FIG. 6 have a functional configuration similar to that of the equalization apparatuses 30-1 to 30-4 shown in FIG. 5, and the description for FIG. 5 applies to them. The controllers 40-11 to 40-14 and 40-21 to 40-24 respectively include control computation units 42-11 to 42-14 and 42-21 to 42-24 and computation-result outputting units 44-11 to 44-14 and 44-21 to 44-24. Output data S"11 to S"14 and S"21 to S"24 are input to the control computation units 42-11 to 42-14 and 42-21 to 42-24 from the data selecting units 38-11 to 38-14 and 38-21 to 38-24 of the equalization apparatuses 30, respectively. The control computation units 42-11 to 42-14 and 42-21 to 42-24 perform control computations in a predetermined control manner on the element values S"11 to S"14 and S"21 to S"24 of the output data to calculate manipulative variables A11 to A14 and A21 to A24, respectively. The control computation units 42-11 to 42-14 and 42-21 to 42-24 output the calculated manipulative variables A11 to A14 and A21 to A24 to the computation-result outputting units 44-11 to 44-14 and 44-21 to 44-24, respectively. The computation-result outputting units 44-11 to 44-14 and 44-21 to 44-24 transmit the manipulative variables A11 to A14 and A21 to A24 to selection apparatuses 50-1 and 50-2 via the network NW, respectively.

In the example shown in FIG. 6, the controllers 40-11 to 40-14 and 40-21 to 40-24 are respectively associated with the selection apparatuses 50-1 and 50-2, and the selection apparatuses 50-1 and 50-2 are respectively associated with actuators 60-1 and 60-2. The selection apparatuses 50-1 and 50-2 respectively determine a representative value Az1 of the manipulative variables A11 to A14, received from the computation-result outputting units 44-11 to 44-14 via the network NW, and a representative value Az2 of the manipulative variables A21 to A24, received from the computation-result outputting units 44-21 to 44-24 via the network NW, in the above-described manner. The selection apparatuses 50-1 and 50-2 output selected data indicating the determined representative values Az1 and Az2 to the actuators 60-1 and 60-2, respectively.

Note that, in the examples shown in FIGS. 5 and 6, a feedback loop may be provided from each of the data selecting units 38-1 to 38-4 to its corresponding one of the received-data outputting units 34-1 to 34-4 in a manner similar to the example shown in FIG. 3. Also, input data indicating a vector value consisting of a plurality of element values may be input to each of the input-data receiving units 32-11 to 32-14 and 32-21 to 32-24 as illustrated in FIGS. 5 and 6. In that case, the data selecting units 38-11 to 38-14 and 38-21 to 38-24 may each select a representative value indicating a vector value as the output data to be output to the controllers 40-11 to 40-14 and 40-21 to 40-24, in the above-described manner.

While the embodiments of the present invention have been described above with reference to the drawings, specific configurations are not limited to the above-described ones, and various design modifications and the like may be made without departing from the spirit of the present invention.

For example, a set of an individual equalization apparatus 30 and one or more corresponding controllers 40 may be implemented as a single integrated device. For example, one PC may have the function of one equalization apparatus 30 and the function of one controller 40. While the example shown in FIG. 5 is an example of applying multi-input/one-output control computation and the example shown in FIG. 6 is an example of applying one-input/multi-output control computation, multi-input/multi-output control computation as their combination may be also be applied. While the above-described embodiments use an example where each equalization apparatus 30 is associated with one or more controllers 40 in the control system 1, this is not so limited. An individual equalization apparatus 30 may be associated with other devices. For example, an equalization apparatus 30 and a storage apparatus (not shown) that stores the output data output from the equalization apparatus 30 may be associated. In that case, equalization will be performed on the respective pieces of output data stored in a plurality of storage apparatuses.

The distribution apparatuses 20, equalization apparatuses 30, controllers 40 and selection apparatuses 50 in the above-described embodiments may be partially implemented with a computer. In that case, programs for implementing the respective functions may be recorded on a computer-readable recording medium so that a computer system reads the programs recorded on the recording medium and an computational processing circuit such as CPU executes them. The "computer system" herein refers to a computer system embedded in a distribution apparatus 20, equalization apparatus 30, controller 40 or selection apparatus 50 and including an OS and hardware such as peripheral devices. The "computer-readable recording medium" refers to a portable medium such as a flexible disk, magneto-optical disk, ROM or CD-ROM, or a storage apparatus such as a hard disk embedded in the computer system. The "computer-readable recording medium" may further include a medium that dynamically stores a program for a short period of time, such as a communication line in the case of transmitting the program via a network such as the Internet or a communication circuit such as a telephone circuit, and a medium that stores the program for a certain period of time, such as a volatile memory in a computer system operating as a server or client in that case. The above-described programs may be for implementing some of the foregoing functions, and may further implement the foregoing functions in combination with programs already recorded in the computer system. The above-described computer system may be configured as a computing resource that is a component of a cloud computing system that allows the interactive transmission of various data via a network. Some or all of the distribution apparatuses 20, equalization apparatuses 30, controllers 40 and selection apparatuses 50 in the above-described embodiments may be implemented as an integrated circuit such as LSI (Large Scale Integration). The functional blocks of the distribution apparatuses 20, equalization apparatuses 30, controllers 40 and selection apparatuses 50 may be individually configured as a processor, or some or all of them may be integrated into a processor. The integrated circuit may be implemented with a dedicated circuit or general-purpose processor, without limiting to LSI. If an integrated circuit technique that can substitute LSI emerges with the advance in semiconductor technology, the technique may be used for the integrated circuit.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A control system comprising:
   a plurality of equalization apparatuses that receive, as input data, data transmitted from a sensor measuring a state of a process; and
   a plurality of computing apparatuses that are provided in correspondence with the respective equalization apparatuses and calculate a manipulative variable of an actuator for controlling the process by using output data from the corresponding equalization apparatuses, wherein each of the equalization apparatuses comprises:
      a received-data outputting unit that sends the input data to a network;
      an other-apparatus-data receiving unit that acquires the input data from the received-data outputting unit and receives, from the network, input data sent from each of other equalization apparatuses; and
      a data selecting unit that selects, as the output data, a representative value of the input data acquired by the other-apparatus-data receiving unit,
   each of the computing apparatuses calculates the manipulative variable of the actuator based on the output data from a corresponding one of the equalization apparatus,
   the data selecting unit outputs the representative value to the received-data outputting unit,
   the received-data outputting unit sends the representative value to the network as the input data,
   the data selecting unit calculates a coincidence degree that is a degree at which respective pieces of the input data acquired from the plurality of equalization apparatuses coincide with each other, and
   the data selecting unit does not output the output data to the computing apparatus and repeats an operation of outputting the representative value to the received-data outputting unit until the coincidence degree reaches equal to or greater than a predetermined threshold of coincidence degree.

2. The control system according to claim 1, wherein each of the equalization apparatuses comprises an input-data receiving unit that, when the input data is not received within a reception period repeated for each control cycle, outputs input data received most recently or predetermined input data to the received-data outputting unit.

3. The control system according to claim 2, wherein the input-data receiving unit adds, to input data to be output to the received-data outputting unit, additional information indicating that the input data is not a latest one.

4. The control system according to claim 1, wherein
   each of the equalization apparatuses comprises the other-apparatus-data receiving unit and the data selecting unit for each channel of input data, and
   each of the computing apparatuses calculates the manipulative variable based on the output data for each channel.

5. The control system according to claim 1, wherein
   a plurality of computing apparatuses, each being the computing apparatus, are associated with each of the equalization apparatuses, and
   each of the plurality of computing apparatuses is associated with some or all elements of the output data and a different actuator, and calculates a manipulative variable of the associated actuator based on the elements.

6. A control method for a control system comprising:
   a plurality of equalization apparatuses that receive, as input data, data transmitted from a sensor measuring a state of a process; and
   a plurality of computing apparatuses that are provided in correspondence with the respective equalization apparatuses and calculate a manipulative variable of an actuator for controlling the process by using output data from the corresponding equalization apparatuses, wherein
   each of the equalization apparatuses performs:
      a received-data outputting step of transmitting the input data to a network;
      an other-apparatus-data receiving step of receiving input data sent from each of other equalization apparatuses; and
      a data selecting step of selecting, as output data, a representative value of the input data acquired by the equalization apparatus itself and the input data acquired in the other-apparatus-data receiving step,
   each of the computing apparatuses performs a manipulative-variable calculating step of calculating the manipulative variable of the actuator based on the output data from a corresponding one of the equalization apparatuses,
   the data selecting step outputs the representative value which is sent to the network as the input data,
   the data selecting step further calculates a coincidence degree that is a degree at which respective pieces of the input data acquired from the plurality of equalization apparatuses coincide with each other, and
   the data selecting step does not output the output data to the computing apparatus and further repeats an operation of outputting the representative value until the coincidence degree reaches equal to or greater than a predetermined threshold of coincidence degree.

7. An equalization apparatus that receives, as input data, data transmitted from a sensor measuring a state of a process, wherein
   the equalization apparatus comprises:
      a received-data outputting unit that sends the input data to a network;
      an other-apparatus-data receiving unit that acquires the input data from the received-data outputting unit and receives, from the network, input data sent from each of a plurality of other equalization apparatuses; and
      a data selecting unit that selects, as output data, a representative value of the input data acquired by the other-apparatus-data receiving unit,
   the data selecting unit outputs the representative value to the received-data outputting unit,
   the received-data outputting unit sends the representative value to the network as the input data,
   the data selecting unit calculates a coincidence degree that is a degree at which respective pieces of the input data acquired from the plurality of other equalization apparatuses coincide with each other, and the data selecting unit does not output the output data to the computing apparatus and repeats an operation of outputting the representative value to the received-data outputting unit until the coincidence degree reaches equal to or greater than a predetermined threshold of coincidence degree.

* * * * *